United States Patent [19]

Kobashi et al.

[11] Patent Number: 4,546,146
[45] Date of Patent: Oct. 8, 1985

[54] PROCESS FOR PRODUCING DISPERSIONS COMPRISING FINE PARTICLES OF ACRYLONITRILE POLYMERS

[75] Inventors: Toshiyuki Kobashi; Hideo Naka, both of Okayama, Japan

[73] Assignee: Japan Exlan Company, Ltd., Osaka, Japan

[21] Appl. No.: 661,332

[22] Filed: Oct. 16, 1984

[30] Foreign Application Priority Data

Oct. 21, 1983 [JP] Japan ................... 58-197745

[51] Int. Cl.$^4$ ................... C08F 220/12; C08F 220/44
[52] U.S. Cl. ................... 524/831; 428/402; 524/560; 524/765; 524/770; 524/773; 524/792; 526/329.3
[58] Field of Search ............ 526/329.3; 428/402; 524/560, 765, 770, 773, 792, 831

[56] References Cited

U.S. PATENT DOCUMENTS 4,061,693 12/1977 Kamiya ................... 526/329.3
4,255,546 3/1981 Süling et al. ................... 526/341

*Primary Examiner*—Harry Wong, Jr.
*Attorney, Agent, or Firm*—Wenderoth, Lind & Ponack

[57] ABSTRACT

A process for copolymerizing acrylonitrile (AN) with an amount of a monomer of a specific structure in an organic solvent which can dissolve AN but cannot dissolve polyacrylonitrile (PAN). The polymer dispersion in the solvent is stable upon storage. The dispersed particles of the polymer are uniform and fine, and are sufficiently prevented from agglomeration and agglutination.

1 Claim, No Drawings

PROCESS FOR PRODUCING DISPERSIONS COMPRISING FINE PARTICLES OF ACRYLONITRILE POLYMERS

BACKGROUND OF THE INVENTION

In recent years, there has been a demand for synthetic polymers in fine particle form, as a property-modifier for plastics, fiber, film, etc. and as a surface-processing material for paper, film, leather, etc. Among others, it is demanded to use AN polymers in fine particle form in the above-mentioned fields because AN polymers are excellent in resistance to light, resistance to weathering and resistance to solvents.

As a process for producing such fine particles of AN polymers, we have, for example proposed an AN polymer aqueous emulsion in Japanese Patent Publication No. 2207/1980. This emulsion is useful as aqueous dispersion, but in order to obtain a dispersion in an organic solvent, it is not only necessary to once separate the polymer from the aqueous emulsion and then disperse it again in the solvent, but also it is very difficult to remove the polymer in fine particle form from the aqueous emulsion because such operation will cause agglomeration and agglutination of the polymer particles.

Accordingly, it is desired to polymerize an AN monomer directly in an organic solvent. However, the cohesive force between AN polymer particles is generally strong, so that when polymerization is carried out in the usual way, the generated polymer particles unite with one another to form coarse, bulky agglomerated particles. Such agglomerated particles can no longer be separated into individual particles by any mechanical means. Therefore, it has been very difficult to obtain fine and uniform AN polymer particles dispersed in an organic solvent.

To overcome this difficulty, in Japanese Patent Publication No. 34396/1970, for example, there has been proposed a method preventing the agglomeration and agglutination of AN polymer particles. In that process an oil-soluble high molecular substance is added as a dispersing agent to increase the viscosity of the polymerization system. However, the effect of preventing agglomeration and agglutination by such a means is not sufficient. Moreover, since there is a need for adding a large amount of the oil-soluble substance, this method undergoes a considerable restriction in practical use. In Japanese Patent Publication No. 8127/1976, a method is proposed in which a monohydric alcohol of 1 to 4 carbon atoms is used as an organic solvent. In this method, not only the kind of solvent used is limited but also the effect of uniform dispersion and stability is insufficient. In this publication it is described that the particles sediment to the bottom of the container during storage.

SUMMARY OF THE INVENTION

In such a situation, we conducted research for the industrial production of uniform, fine particles of AN polymer stably dispersed in an organic solvent, which production has been heretofore regarded as difficult. As a result we have found that, when AN is copolymerized with a monomer of a specific structure in an organic solvent which can dissolve AN but cannot dissolve PAN, it is possible to directly produce an organic solvent AN polymer dispersion which is excellent in storage stability and in which the polymer particles are dispersed uniformly and finely and the agglomeration and agglutination between the dispersed particles are remarkably prevented. This discovery led us to the present invention.

Therefore, an object of the present invention is to provide an industrially advantageous process for producing an organic solvent AN polymer dispersion which is excellent in storage stability and in which the diameter of the dispersed particles is uniform and fine.

Another object of the invention is to provide a process for producing an AN polymer dispersion of fine particles in an organic solvent which can be used without restriction in the various fields as a property-modifier for plastics, fiber, film, etc. and as a surface-processing material for paper, film, leather, etc.

Such objects of the present invention can be attained by copolymerizing the following monomers (a) to (c) in an organic solvent which can dissolve AN but cannot dissolve PAN:

(a) 70–98 weight % of AN,
(b) 30–2 weight % of a long-chain alkyl (meth)acrylate represented by the following general formula:

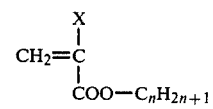

wherein X represents H or $CH_3$ and n represents an integer from 12 to 22, (c) 0–28 weight % of another ethylenic unsaturated compound

DETAILED DESCRIPTION OF THE PREFERRED EMBODIMENT

In the following, the present invention is explained in detail.

First, it is necessary to determine the copolymerization ratio of AN, the main component, at above 70 weight %, preferably above 80 weight %. In the case where the ratio is out of the lower limit of that range, the various excellent properties intrinsic to AN polymers, such as the resistance to light, resistance to weathering, resistance to solvents, etc. cannot be displayed.

Next, the long-chain alkyl acrylates or the long-chain alkyl methacrylates which are the indispensable components to be copolymerized with AN in the present invention are the monomers represented by the following general formula:

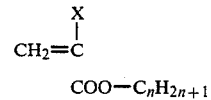

wherein X represents H or $CH_3$, and n represents an integer from 12 to 22.

It is necessary for the copolymerization ratio of such a monomer to be above 2 weight %, preferably above 3 weight %. In the case where the ratio is below this value, the agglomeration of polymer particles will occur and therefore it becomes impossible to obtain a satisfactory dispersion. Also, when n is less than 12, the effect of dispersion and stabilization will become insufficient, and this results in partial mixing of agglomerated particles in the dispersion, or instability of the dispersion upon storage for a long time. On the other hand, when n exceeds 22, the copolymerization activity drops sharply, so that not only the dispersibility improving effect is made insufficient by the decrease of the introduced amount of that monomer, but also a large amount of that monomer remains unreacted. Therefore, this may cause a problem in the performance of the resulting polymer depending on its use, and also is not economic.

As the other ethylenic unsaturated monomers copolymerized in compliance with desire there may be mentioned known unsaturated compounds that can be copolymerized with AN, for example, vinyl halides and vinylidene halides such as vinyl chloride, vinyl bromide, vinyl fluoride, vinylidene chloride, vinylidene bromide, vinylidene fluoride, etc.; unsaturated carboxylic acids such as acrylic acid, methacrylic acid, maleic acid, itaconic acid, etc. and salts thereof; acrylic acid esters and methacrylic acid esters such as methyl(meth)acrylate, ethyl(meth)acrylate, butyl(meth)acrylate, octyl(meth)acrylate, methoxymethyl(meth)acrylate, phenyl(meth)acrylate, cyclohexyl(meth)acrylate, etc.; unsaturated ketones such as methyl vinyl ketone, phenyl vinyl ketone, methyl isopropenyl ketone, etc.; vinyl esters such as vinyl formate, vinyl acetate, vinyl propionate, vinyl butyrate, vinyl benzoate, etc.; vinyl ethers such as methyl vinyl ether, ethyl vinyl ether, etc.; acrylamide and its alkyl substituted compounds; unsaturated sulfonic acids such as vinylsulfonic acid, (meth)allylsulfonic acid, p-styrenesulfonic acid, methacrylic acid sulfoethyl ester, methacrylic acid sulfopropyl ester, 2-acrylamide-2-methylpropanesulfonic acid, etc. and their salts; styrene and its alkyl- or halogen-substituted compound such as styrene, α-methylstyrene, chlorostyrene, etc.; allyl alcohol and its esters and ethers; basic vinyl compounds such as vinylpyridine, vinylimidazole, dimethylaminoethyl methacrylate, etc.; vinyl compounds such as (meth)acrolein, vinylidene cyanide, glycidyl methacrylate, methacrylonitrile, etc.

As the dispersion media, namely the organic solvents which can dissolve AN but cannot dissolve PAN, there may be mentioned aromatic hydrocarbons such as toluene, xylene, ethylbenzene, etc.; acetic acid esters such as ethyl acetate, butyl acetate, isopropyl acetate, amyl acetate, ethyl acetate glycol, etc.; ketones such as acetone, methyl ethyl ketone, methyl isobutyl ketone, etc.; alcohols such as methanol, ethanol, n-butanol, n-propanol, etc.; cellosolves such as methyl cellosolve, ethyl cellosolve, butyl cellosolve, etc.; chlorinated hydrocarbons such as trichloroethylene, dichloroethane, chloroform, etc.

The polymerization initiators used in the polymerization of the above-mentioned monomers are heretofore known oil-soluble radical initiators such as azo compounds, organic peroxides, etc. Among such azo compounds may be mentioned, for example, 2,2'-azobisisobutyronitrile, 2,2'-azobis(2-methylvaleronitrile), 2,2'-azobis(2,4-dimethylbutyronitrile), 2,2'-azobis(2-methylcapronitrile), 2,2'-azobis(2,3,3-trimethylbutyronitrile), 2,2'-azobis(2,4,4-trimethylvaleronitrile), 2,2'-azobis(2,4-dimethylvaleronitrile), 2,2'-azobis(2,4-dimethyl-4-ethoxyvaleronitrile), 2,2'-azobis(2,4-dimethyl-4-n-butoxyvaleronitrile), etc. Among the organic peroxides may be mentioned, for example, acetyl peroxide, propionyl peroxide, isobutyryl peroxide, octanoyl peroxide, decanoyl peroxide, lauroyl peroxide, 3,5,5-trimethylhexanoyl peroxide, benzoyl peroxide, diacyl peroxides such as diisopropyl peroxydicarbonate, di-2-ethylhexyl peroxydicarbonate; peroxy esters such as t-butyl peroxyisobutylate, t-butyl peroxypivalate, t-butyl peroxyneodocanoate, t-butyl peroxylaurate, etc. Of course, two or more of the above-mentioned oil-soluble radical initiators may be used in suitable combination.

The polymerization temperature depends on the kind of the polymerization initiators to be used. However, it is desirable to determine it generally within the range of from 40° to 100° C. In the case where the temperature is out of the lower limit of this temperature range, the reaction velocity becomes low, so that such a temperature is not desirable in respect of productivity and economy. When the temperature exceeds the upper limit of the range, problems such as coloring of the polymer may be caused, so that such a temperature is not also desirable.

We do not fully understand why the process of the invention weakens the cohesive force between the polymer particles to give a stable organic solvent dispersion composed of AN polymer fine particles substantially less than 1μ. However, we believe that the long-chain alkyl(meth)acrylate chains introduced into the polymer as a copolymer component and existing on the surface of the polymer particles produce a steric hindrance effect.

As for the organic solvent dispersion of AN polymer fine particles of the present invention, not only the particles are uniform and fine but also the dispersion maintains a stably dispersed state upon storage for a long time even without addition of an ordinary emulsifier or dispersing agent. The dispersion has an excellent dispersibility when it is mixed with pigments, paints, high molecular substance solutions, etc., so that when applied to various use fields, the dispersion can effectively display the excellent characteristics intrinsic to AN polymers.

It is an effect of the present invention worthy of special mention that the organic solvent dispersion of AN polymer fine particles possessing such excellent characteristics can be produced without requiring any complicated operation.

In the following, the present invention is explained in further detail by way of Examples, but the invention is not limited for its scope by the description of these Examples, wherein percentages are by weight unless otherwise indicated.

EXAMPLE 1

The following composition was charged into a three-mouth flask of 2 liter capacity equipped with stirrer wings and a cooling condenser, and polymerization was carried out at 60° C. for 6 hours:

| | |
|---|---|
| AN | 185 g |
| stearyl methacrylate (SMA) | 15 g |
| 2,2'-azobis(2-methyl-valeronitrile) | 2 g |
| xylene | 798 g |

An AN polymer dispersion was obtained whose solid matter was 19.5% and particle diameter was less than 1μ.

This dispersion was allowed to stand for 3 months at room temperature, but no precipitate of the polymer was observed.

On the other hand, polymerization was carried out in the same way as above except that SMA was not used and 200 g AN was used. After about one hour from the start of polymerization, the viscosity of the polymerization system increased, and after 2 hours, the system took on the appearance of a paste. Microscopic observation showed that the polymer was composed of agglomerated masses of 10 to 30μ.

Also, polymerization was carried out in the same way as above except that octyl methacrylate was used in place of SMA. There was an improvement in the dispersed state of the particles in comparison with the single use of AN; however, the viscosity of the polymer dispersion obtained was high, and the particles were agglomerated bodies of about 10μ.

EXAMPLE 2

Polymerization was conducted according to the prescription described in Example 1 except that, as monomers, 190 g AN and 10 g of the four kinds of long-chain alkyl methacrylates shown in Table 1 were used and ethyl acetate glycol was used in place of xylene.

The solid matter concentrations of the polymer dispersions obtained are also set forth in the Table below.

TABLE

| No. | 1 | 2 | 3 | 4 |
|---|---|---|---|---|
| Long-chain alkyl methacrylate | Lauryl MA | Cetyl MA | SMA | Behenyl MA |
| Solid matter (%) | 19.7 | 19.5 | 19.6 | 19.2 |

In any of No. 1 to No. 4, a dispersion of fine particles less than 1μ was obtained.

EXAMPLE 3

Polymerization was carried out in the same way as in Example 2 (No. 3) except that isopropyl acetate was used in place of ethyl acetate glycol. An excellent dispersion of polymer particles less than 1μ was obtained.

What is claimed is:

1. A process for producing a dispersion of acrylonitrile polymer fine particles having a particle diameter of substantially less than 1μ which comprises copolymerizing, at a temperature of 40° to 100° C. and in the presence of an oil-soluble radical polymerization initiator, the following monomers (a) to (c) in an organic solvent which can dissolve acrylonitrile but cannot dissolve polyacrylonitrile:

(a) 70–98 weight % of acrylonitrile,
(b) 30–2 weight % of a long-chain alkyl(meth)acrylate represented by the following general formula:

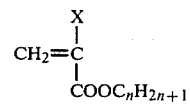

wherein X represents H or $CH_3$ and n represents an integer from 12 to 22,
(c) 0–28 weight % of another ethylenic unsaturated compound.

* * * * *